US011413839B2

(12) United States Patent
Panchal et al.

(10) Patent No.: US 11,413,839 B2
(45) Date of Patent: Aug. 16, 2022

(54) DEVICE TO LEVEL A FEEDER PLATFORM

(71) Applicant: Natoli Engineering Company Inc, St. Charles, MO (US)

(72) Inventors: Mahesh Panchal, Ahmedabad (IN); Pritesh Patel, Ahmedabad (IN); Vishal Dodia, Ahmedabad (IN)

(73) Assignee: Natoli Engineering Company, Inc., St. Charles, MO (US)

( * ) Notice: Subject to any disclaimer, the term of this patent is extended or adjusted under 35 U.S.C. 154(b) by 137 days.

(21) Appl. No.: 16/713,251

(22) Filed: Dec. 13, 2019

(65) Prior Publication Data

US 2021/0031478 A1    Feb. 4, 2021

Related U.S. Application Data

(60) Provisional application No. 62/779,565, filed on Dec. 14, 2018.

(51) Int. Cl.
*B30B 15/30* (2006.01)
*A61J 3/10* (2006.01)
*B30B 11/08* (2006.01)
*B30B 15/00* (2006.01)

(52) U.S. Cl.
CPC ............... *B30B 15/304* (2013.01); *A61J 3/10* (2013.01); *B30B 15/0029* (2013.01); *B30B 11/08* (2013.01); *B30B 15/302* (2013.01)

(58) Field of Classification Search
CPC . B30B 15/304; B30B 15/302; B30B 15/0029; B30B 15/08; B30B 15/2009; B30B 11/08; A61J 3/10
See application file for complete search history.

(56) References Cited

U.S. PATENT DOCUMENTS 4,081,910 A * 4/1978 Hammond ............... G01B 3/30
                                                        425/170
5,213,816 A * 5/1993 Smyth, Jr. ............... B29C 43/34
                                                        425/219

(Continued)

FOREIGN PATENT DOCUMENTS

CN         103499312 A *  1/2014

OTHER PUBLICATIONS

Tang et al. (CN 103499312), Plane Parallelism Measuring Device (Jan. 8, 2014), English Translation from Google Patents (Year: 2014).*

*Primary Examiner* — Seyed Masoud Malekzadeh
(74) *Attorney, Agent, or Firm* — Linda L Lewis

(57) ABSTRACT

A leveling device for leveling a feeder platform relative to a die table of a tablet compression machine to a desired distance, the leveling device comprising a top plate, a bottom plate, and at least three distance sensors; the top plate and the bottom plate are attached and the top plate has a top plate surface and a proximate feeder platform surface; the bottom plate has a die table engaging surface and the at least three adjustable distance sensors are mounted in a non-linear fashion on the proximate feeder platform surface; the die table engaging surface and the proximate feeder surface are essentially flat and are parallel to the each other and the die table engaging surface and the proximate feeder surface are sized such that when mounted on the tablet compression machine the die table engaging surface is parallel and proximate to the die table and the proximate feeder platform surface is approximately parallel and proximate to the feeder platform.

A device for leveling the feeder platform relative to the die table of a tablet compression machine where the device has a base having top surface, a die table engaging surface and a proximate feeder platform surface. The die table surface and the proximate feeder surface are essentially flat and (Continued)

level or parallel with each other. The surfaces are sized such that when mounted on a tablet compression machine, the die table engaging surface is level with and parallel to the die table and the proximate feeder platform surface is approximately parallel to the feeder platform. The proximate feeder platform surface has three or more adjustable sensors attached so that the sensors are in a non-linear arrangement and are level with and parallel to the die table.

8 Claims, 8 Drawing Sheets

(56) References Cited

U.S. PATENT DOCUMENTS

| | | | | |
|---|---|---|---|---|
| 5,670,167 | A * | 9/1997 | Sleath | B30B 11/02 |
| | | | | 424/464 |
| 5,861,180 | A * | 1/1999 | Kaneko | B29C 31/066 |
| | | | | 425/150 |
| 6,312,629 | B1 * | 11/2001 | Gusack | G01G 13/024 |
| | | | | 264/109 |
| 7,245,982 | B2 * | 7/2007 | Morfino | G05B 19/4015 |
| | | | | 318/632 |
| 7,713,469 | B2 * | 5/2010 | Schmidt | B29C 43/58 |
| | | | | 419/68 |
| 2002/0001534 | A1 * | 1/2002 | Kuniyoshi | B22F 3/004 |
| | | | | 425/78 |
| 2003/0068367 | A1 * | 4/2003 | Sowden | A61P 29/00 |
| | | | | 264/79 |
| 2004/0131675 | A1 * | 7/2004 | Yamamoto | B30B 11/08 |
| | | | | 264/109 |
| 2005/0202082 | A1 * | 9/2005 | Hibino | A61K 9/0056 |
| | | | | 424/464 |

* cited by examiner

DEVICE TO LEVEL A FEEDER PLATFORM

CROSS-REFERENCE TO RELATED APPLICATIONS

This application claims the benefit of U.S. Provisional Patent Application 62/779,565 filed Dec. 14, 2018, which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to tablet compression machines, and more particularly to a device to level the feeder platform relative to the die table of a tablet compression machine.

Related Art

Prior art methods have been used for leveling the feeder platform. The feeder platform must leveled before fitting the feed frame to it. This is done by placing a parallel ground bar about 1 inch square and 8 inches long on the platform. The surface of the platform is checked using a feeler gauge to be perfectly parallel with the die table. For most tablet compression machines, the height of the platform must be 0.0015 inch to 0.002 inch (0.0381 mm to 0.0508 mm) higher or less than the die table, depending on the tablet press. If any deviation is found, the feeder platform is adjusted.

For feeder platforms with three adjustable legs, each leg, as each leg is adjusted, the feeder platform tilts relative to the other legs. To get the platform perfectly even, multiple adjustments are made on each leg. This process can take up to two hours. The present invention enables this process to be completed in minutes.

Proper adjustment is required for the tablet compression machine to function and not be damaged. If the clearance between the feeder platform and the die table is too great, there will be more spillage of the material from the space between the feed frame and the die table. If the clearance is too little, the bottom surface of the feed frame and die table may be damaged.

SUMMARY OF THE INVENTION

The present invention relates to a device for leveling the feeder platform relative to the die table of a tablet compression machine, where the device 50 has a base 1 having a top plate 52 with a top plate surface 2 and a proximate feeder platform surface 6, and a bottom plate 54 having a die table engaging surface 4. The die table surface and the proximate feeder surface are essentially flat and parallel with each other. The surfaces are sized such that when mounted on a tablet compression machine, the die table engaging surface is parallel to the die table and the proximate feeder platform surface is approximately parallel to the feeder platform. The proximate feeder platform surface has at least three sensors attached so that the sensors are in a non-linear arrangement and the tips of the sensors 53 can be linearly adjusted to the desired position relative to the feeder platform. In a preferred embodiment, the proximate feeder platform surface is offset from the die table engaging surface, creating an offset gap 64 between the feeder platform and the proximate feeder platform surface. The offset gap provides space for the device 50 to be mounted over mounting bolts or other upward projecting objects without interfering with the leveling process.

When the device for leveling the feeder platform is used, the die table engaging surface is mounted on the die table of a tablet compression machine. The three or more sensors are linearly adjusted to be approximately equidistant from the die table. The adjustable supports of the feeder platform are adjusted until the desired distance (d) is observed on the sensor readout(s). The device is then removed.

The present invention further claims a method of using a leveling device for leveling a feeder platform relative to a die table of a tablet compression machine to a desired distance, the leveling device comprising a top plate, a bottom plate, and at least three distance sensors. The top plate and the bottom plate are attached and the top plate has a top plate surface and a proximate feeder platform surface. The bottom plate has a die table engaging surface and the at least three linearly adjustable distance sensors are mounted in a non-linear fashion on the proximate feeder platform surface. The die table engaging surface and the proximate feeder surface are essentially flat and are parallel to the each other and the die table engaging surface and the proximate feeder surface are sized such that when mounted on the tablet compression machine the die table engaging surface is parallel and proximate to the die table and the proximate feeder platform surface is approximately parallel and proximate to the feeder platform. The method comprises:

mounting the leveling device on the tablet compression machine;

wherein the distance sensors are proximate the feeder platform;

wherein the distance sensors are horizontally aligned with the die table and approximately equidistant from the feeder platform;

wherein the distance sensors have at least one display;

wherein the at least one display shows a "zero" distance value;

wherein the feeder platform further comprises adjustable supports; and adjusting the adjustable supports of the feeder platform to a desired distance, thereby leveling the feeder platform.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
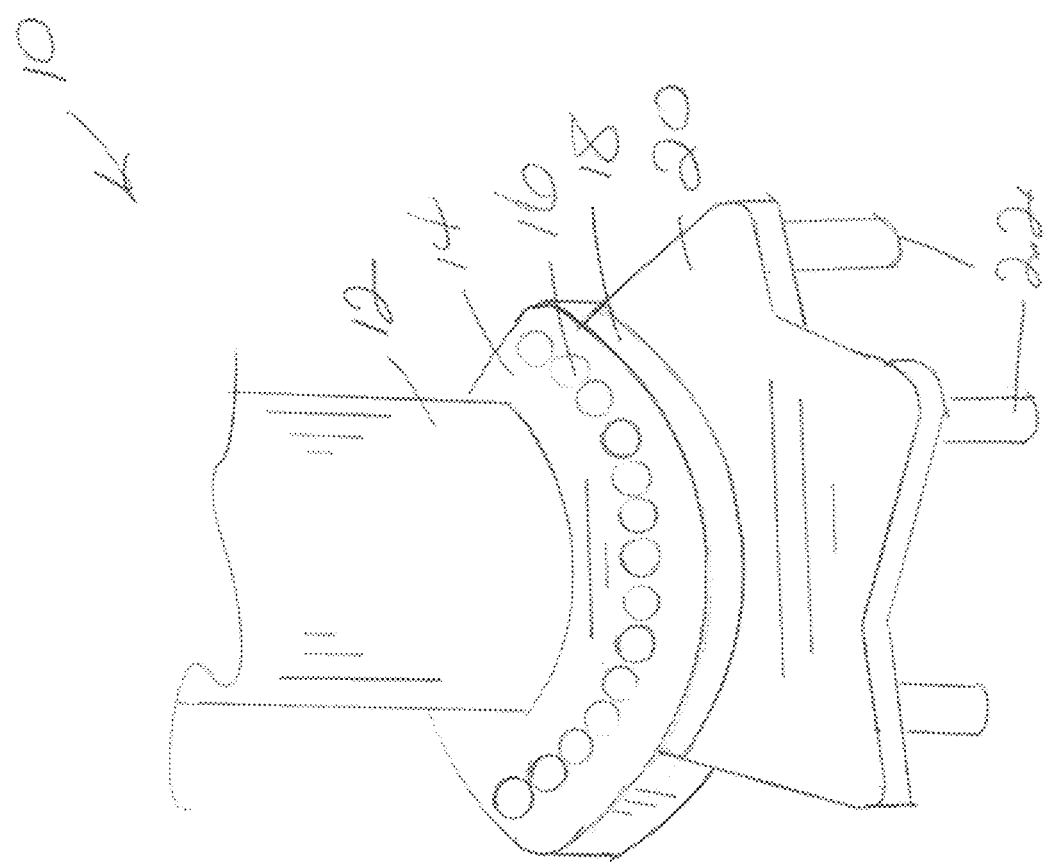
FIG. 1 is a front perspective cutaway view of a rotary table compression machine.
Figure 2:
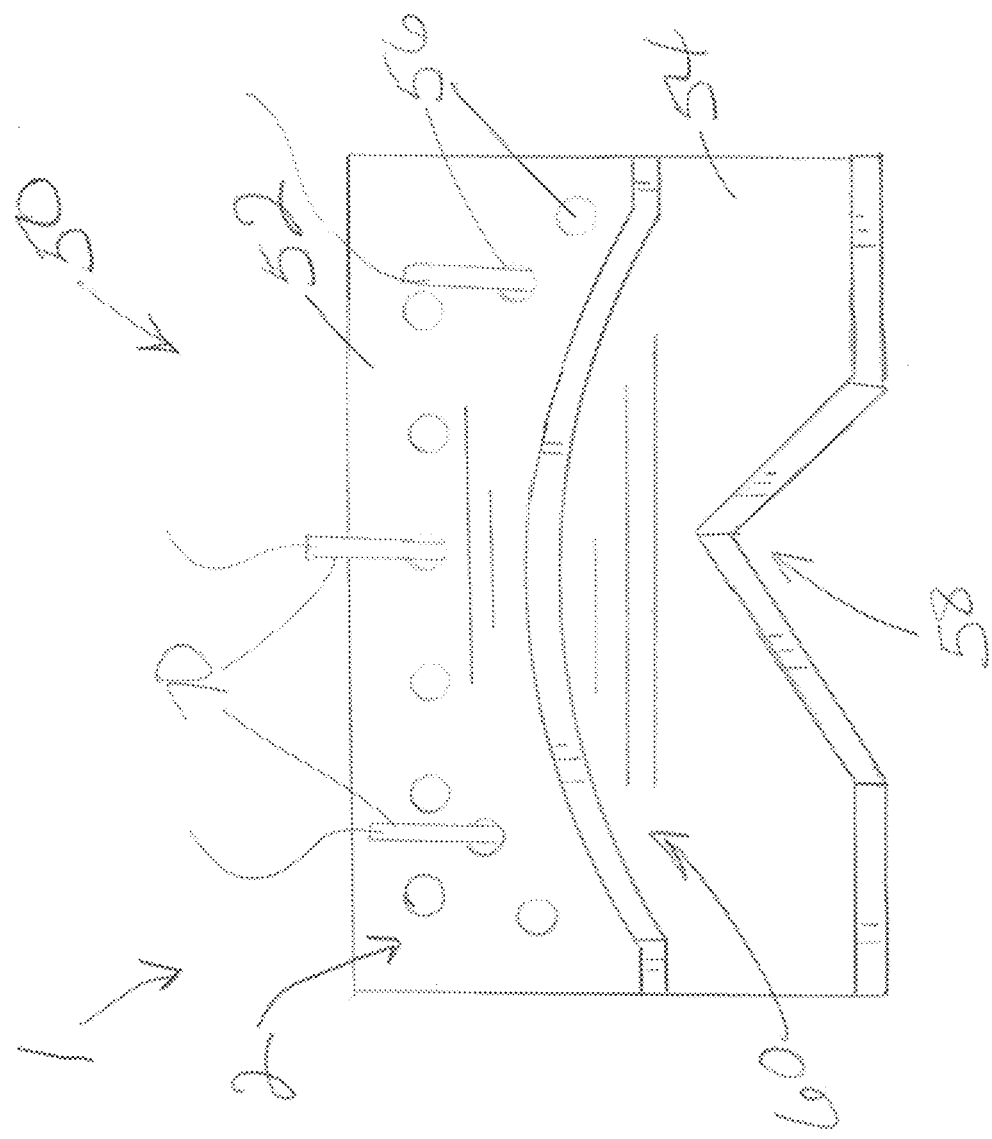
FIG. 2 is a top front perspective view of an embodiment of the leveling device.

As shown in FIG. 1, a rotary tablet compression machine 10 has a turret neck 12, a die table 14, die pockets 16, a die table interface 18, a feeder platform 20 and adjustable supports 22. Preferably, there are at least three adjustable supports arranged in a non-linear arrangement. The die table interface is made from a strong plastic such as high density polyethylene that provides some flexibility when the feeder platform is adjusted using the adjustable supports.

As shown in FIGS. 2 through 8, the leveling device 50 has a rigid top plate 52, a rigid bottom plate 54 and three (3) or more linearly adjustable sensors mounted in through-holes 56 in the top plate. The top plate and the bottom plate must be rigid to level the device. Any flexibility introduces error into the leveling process. The top plate is used for sensing and the bottom plate is used for calibration. The bottom plate has a turret notch 58 and to top plate a clearance cutout 60. The turret notch 58 is configured to engage with the turret neck 12. It allows the bottom plate 54 to rest on the die table 14 when the device is mounted for use. The clearance cutout 60 is configured to engage with the die table. The turret notch and the clearance cutout allow the device 50 to nest with the rotary table of a compression machine when mounted.

Figure 6:
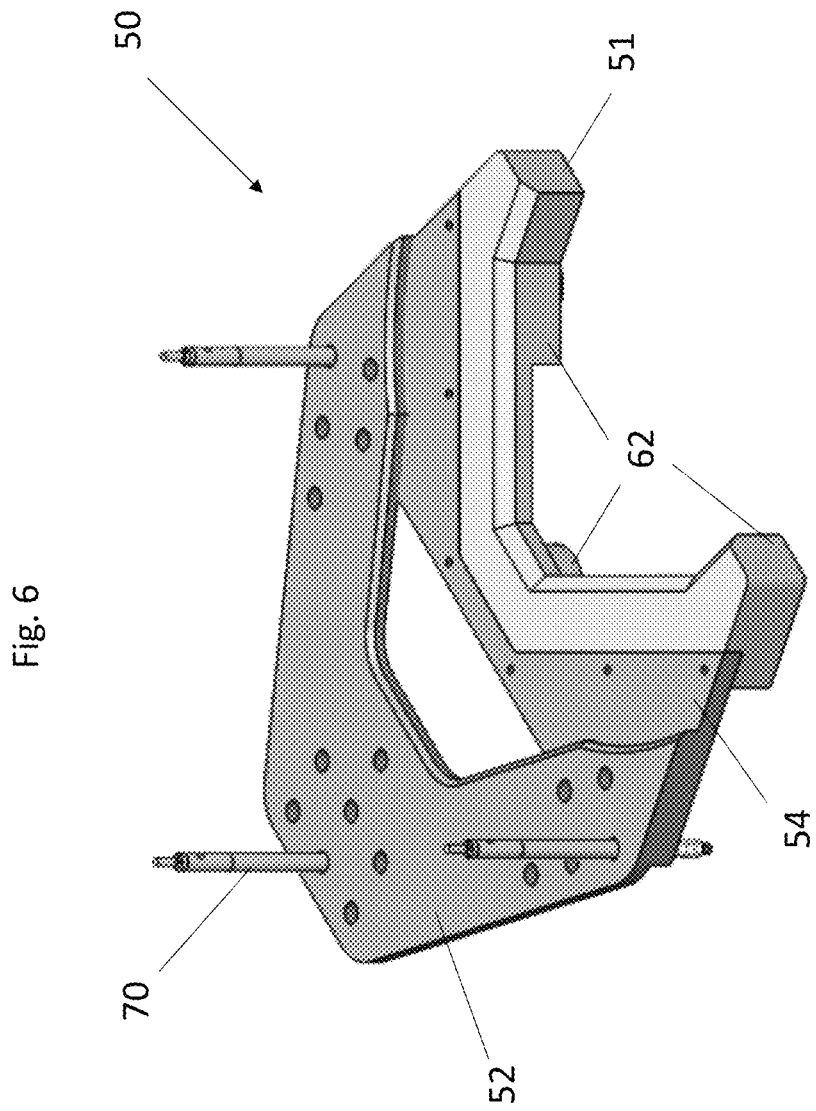
FIG. 6 is a top raised perspective view of an embodiment of the leveling device.
Figure 7:
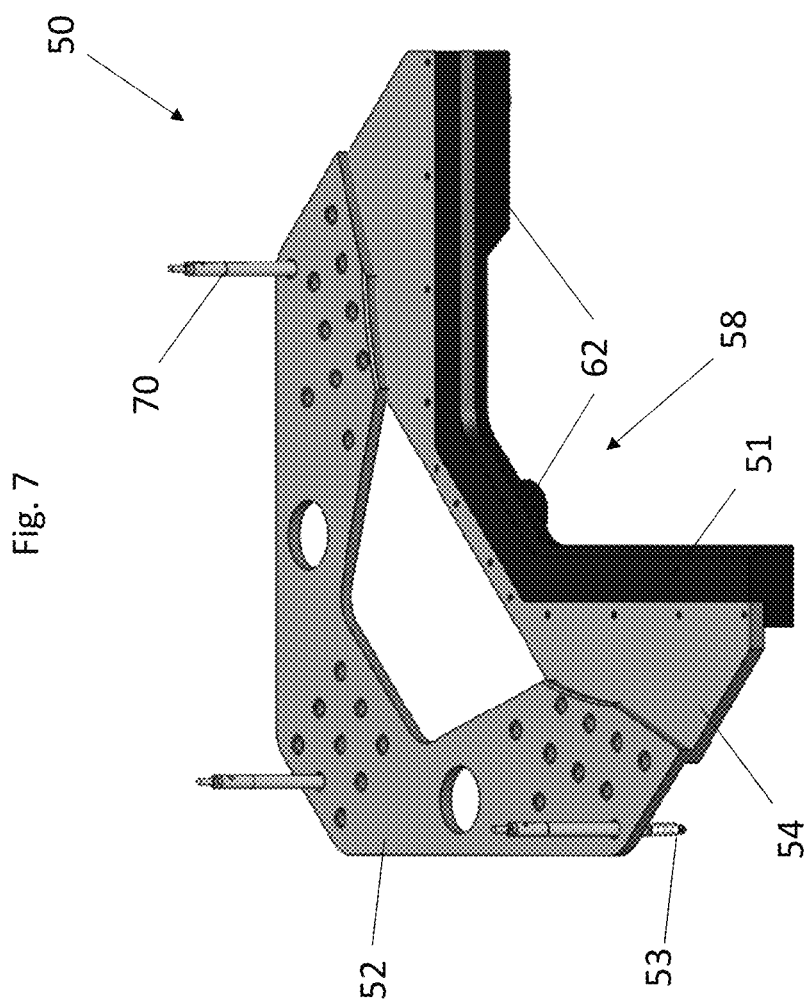
FIG. 7 is a top raised perspective view of an embodiment of the leveling device.
Figure 8:
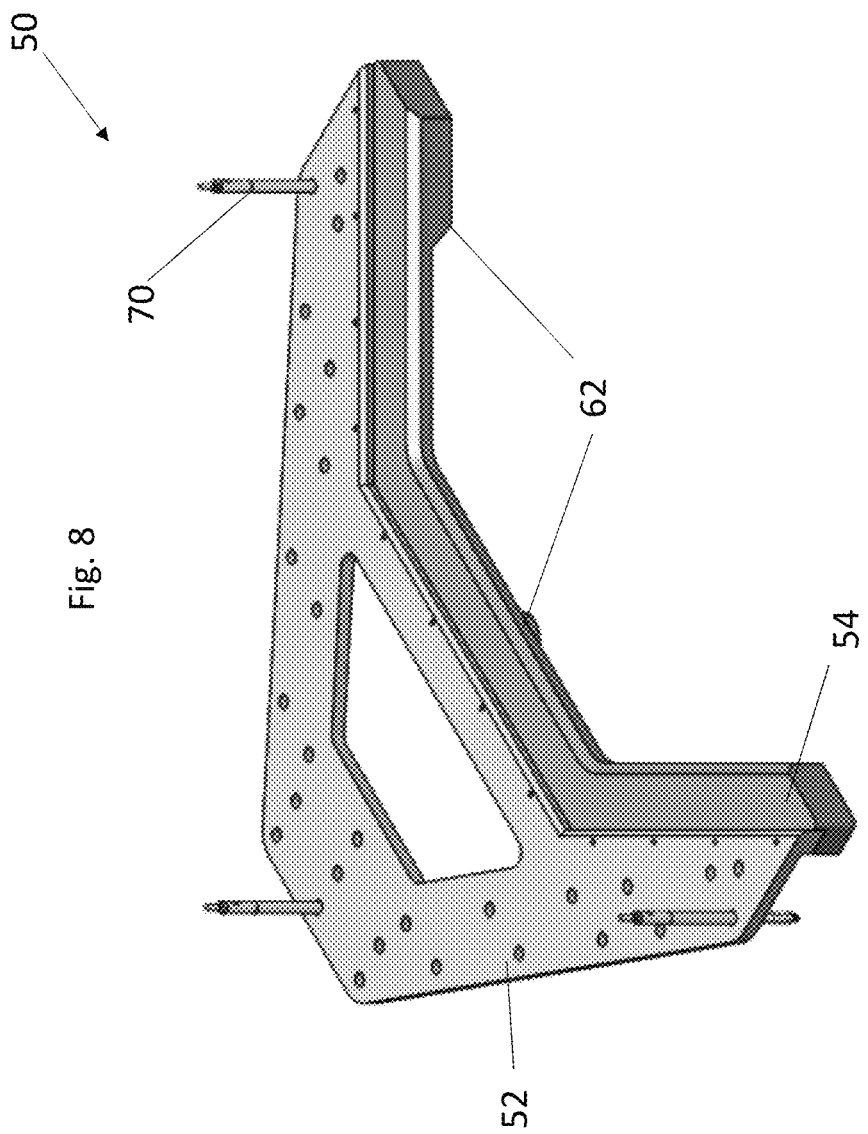
FIG. 8 is a top raised perspective view of an embodiment of the leveling device.

The bottom plate and the top plate can be fixedly attached or releasably attached. They can be two or more separate parts or formed as one part as shown in FIGS. 6 and 7. Optionally, the bottom plate is made from two parts, including a bottom plate nesting portion 51. The nesting portion 51 has the turret notch 58 and at least one raised foot 62, as shown in FIGS. 6, 7 and 8.

In a preferred embodiment, the at least three adjustable sensors 70 have connecting wires 72 that attach to a display or multiple displays. Alternatively, the adjustable sensors can operate wirelessly. Preferably, there is a single display device with separate displays for each sensor. The sensors are linearly adjustable distance sensors, and in a preferred embodiment, the sensors are ultrasonic sensors. In a preferred embodiment, the sensors are mounted in the through holes 56, and are arranged in a non-linear arrangement. The non-linear arrangement provides optimal sensor feedback when leveling the feeder platform 20. In a preferred arrangement, the sensors are mounted proximate the adjustable supports 22. The top plate and the bottom plate are preferably made from aluminum metal.

In an embodiment, the sensors are mounted on the top plate using mounting devices other than through holes.

Figure 3:
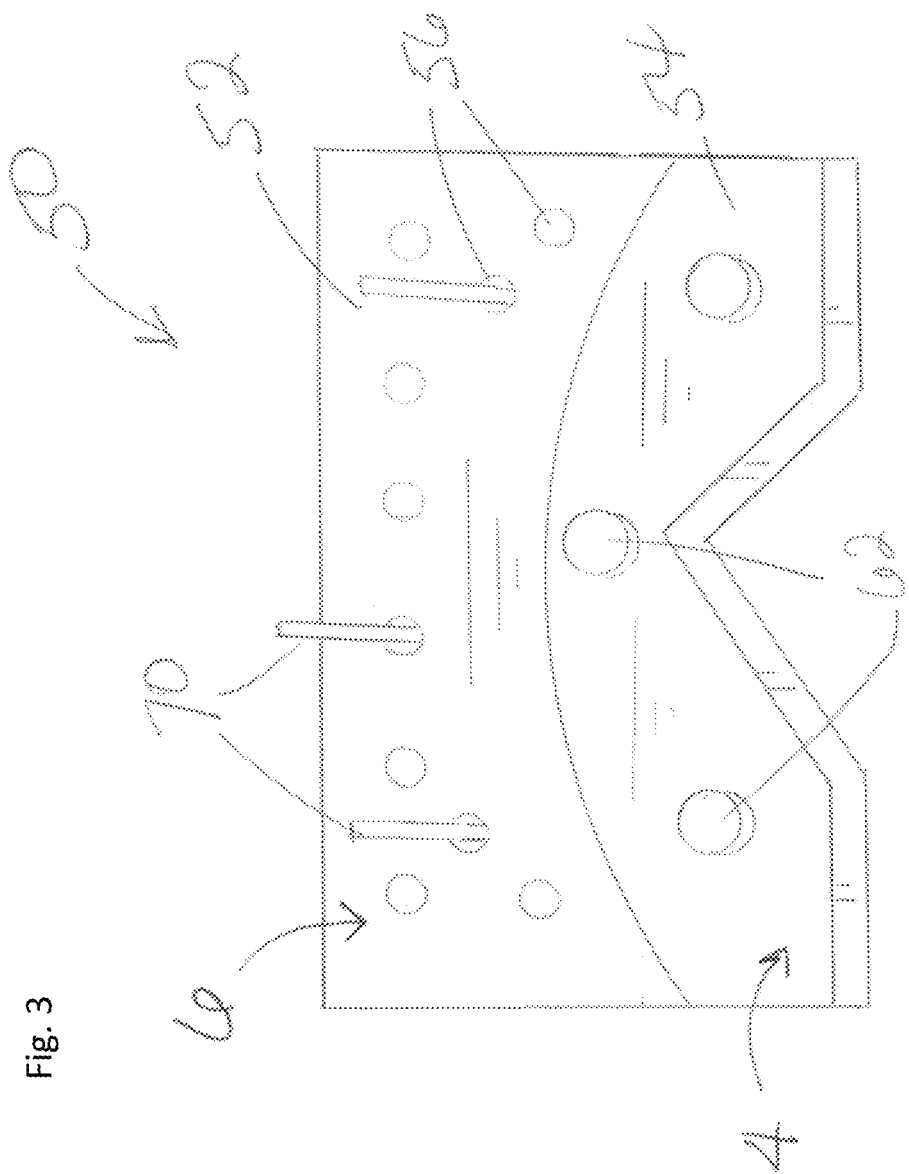
FIG. 3 is a bottom front perspective view of an embodiment of the leveling device.
Figure 4:
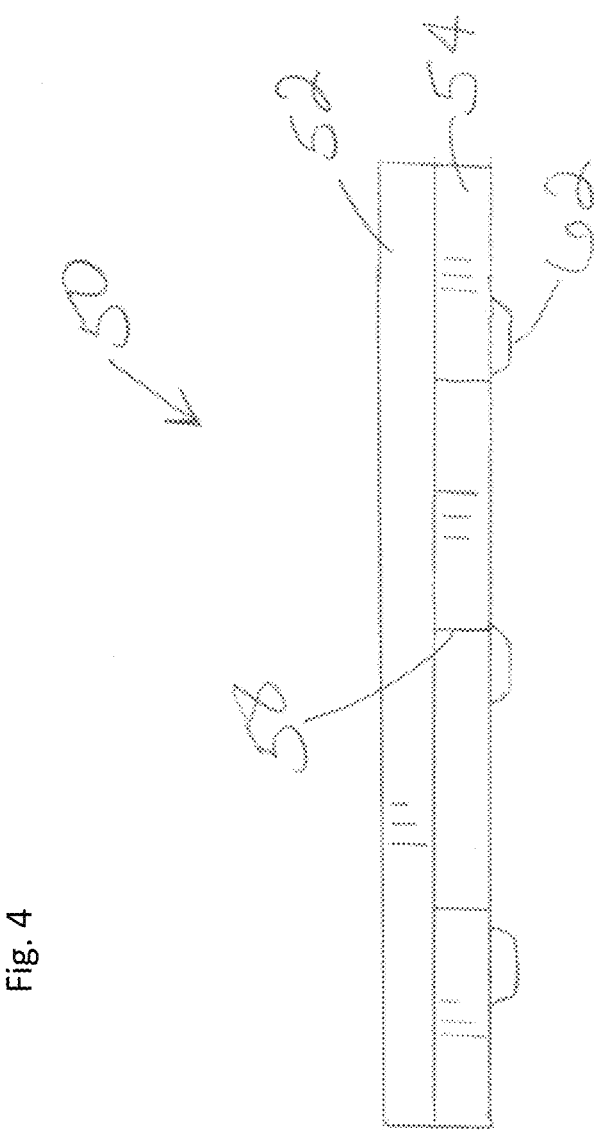
FIG. 4 is a front side view of an embodiment of the leveling device.

As shown in FIG. 3, the die table engaging surface 4 has at least one raised foot 62 that rests on the die table 14 and facilitates leveling of the feeder platform when mounted. In a preferred embodiment, there are three or more raised feet. The feet can be identical and have a flat portion to rest on the die table, or can be varied in size and shape, as shown in FIGS. 6, 7 and 8. Preferably, there are three raised feet.

Figure 5:
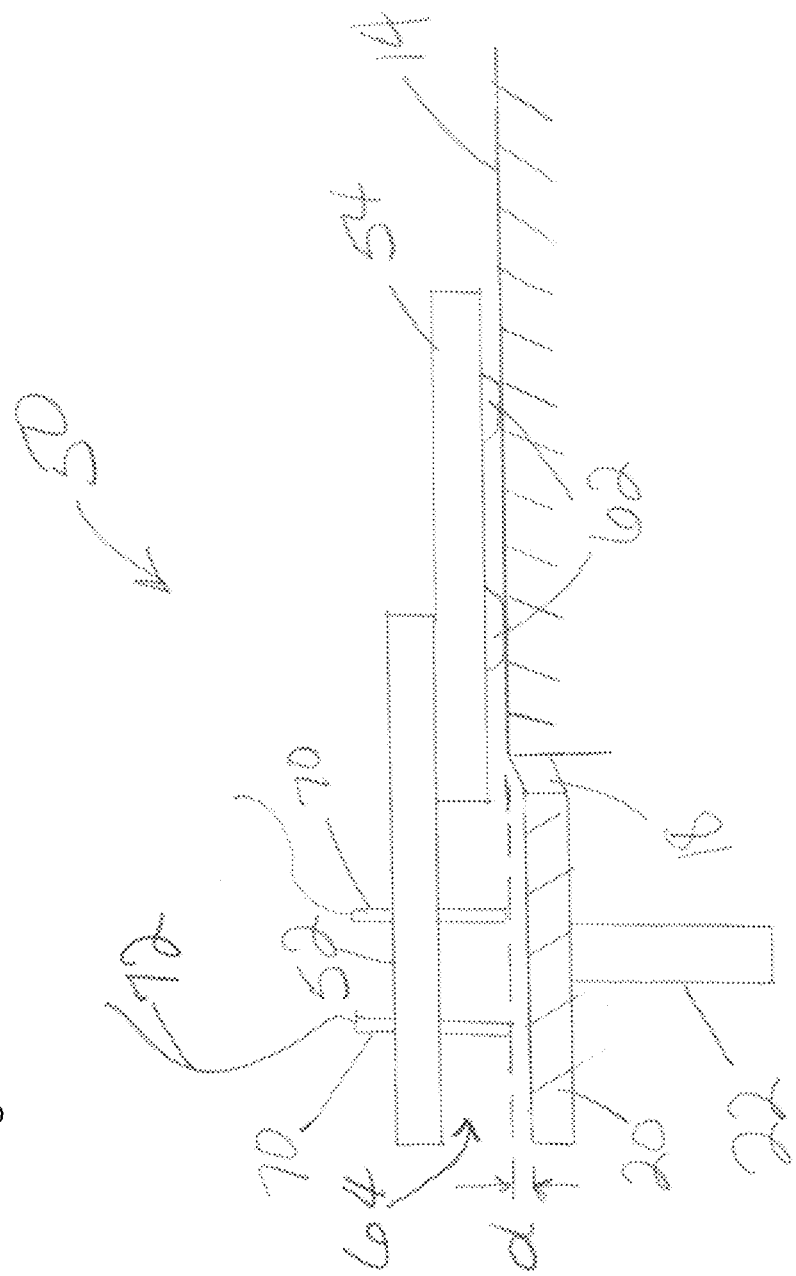
FIG. 5 is a side cutaway view of an embodiment of the leveling device mounted on die table of a tablet compression machine.

As shown in FIG. 5, the at least three sensors project downward from the sensor through-holes 56 and are adjusted to be level with the die table. A calibration method is used when adjusting the sensors to be level with the die table. The device 50 is set on a flat calibration plate before mounting on the feeder platform. The feet 62 rest on the calibration plate. The at least three distance sensors are adjusted to be level with the calibration plate, and the sensors are zeroed out. After calibration, the device 50 is mounted on the rotary table compression machine, and the sensors are proximate the feeder platform and approximately equidistant from the feeder platform. The adjustment gap (d) is based on the optimal value for the particular rotary tablet compression machine. Typically, the adjustment gap is set from about 0.0015 inch to 0.002 inch (0.0381 mm to 0.0508 mm). In the case of an optional zero clearance feeder, the platform would be set flush to the die table. The adjustable supports 22 are adjusted to achieve the desired adjustable gap (d) as detected by the sensors and displayed on readout(s) which can be mounted on the leveling device or remote from the leveling device. When all the sensors indicate the adjustable gap is at the desired value, the leveling process is complete and the leveling device 50 is removed.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of using a leveling device for leveling a feeder platform to be parallel to a die table of a rotary tablet compression machine to a desired distance, the leveling device comprising:
   a top plate, a bottom plate, and at least three distance sensors;
   wherein the top plate and the bottom plate are attached;
   wherein the top plate and the bottom plate are rigid;
   wherein the top plate has a top plate surface and a feeder platform surface;
   wherein the bottom plate has a die table engaging surface;
   wherein the feeder platform surface is offset from the die table engaging surface, creating an offset gap between the feeder platform and the feeder platform surface; and
   wherein the at least three distance sensors are mounted in a non-linear fashion on the feeder platform surface;
   wherein the at least three distance sensors are linearly adjustable;
   wherein the die table engaging surface and the feeder platform surface are essentially flat and are parallel to the each other; and wherein the die table engaging surface and the feeder platform surface are sized such that when mounted on the rotary tablet compression machine, the die table engaging surface is parallel to the die table and the feeder platform surface is parallel to the feeder platform in order to level the feeder platform to be parallel to the die table of the rotary tablet compression machine;

wherein the method comprises:

mounting the leveling device on the rotary tablet compression machine;

wherein the distance sensors are equidistant from the feeder platform;

wherein the distance sensors are horizontally aligned with the die table;

wherein the distance sensors have at least one display;

wherein the at least one display shows a "zero" distance value;

wherein the feeder platform further comprises adjustable supports; and adjusting the adjustable supports of the feeder platform to a desired distance, thereby leveling the feeder platform to be parallel to the die table.

2. The method of using a leveling device of claim 1, wherein the bottom plate has a turret notch configured to engage with a turret on the rotary table compression machine.

3. The method of using a leveling device of claim 2, wherein the top plate has a clearance cutout configured to engage with the die table.

4. The method of using a leveling device of claim 3, wherein the die table engaging surface has three or more raised feet.

5. The method of using a leveling device of claim 4, wherein the bottom plate has a bottom plate nesting portion.

6. The method of using a leveling device of claim 5, wherein the adjusting of adjustable supports comprises multiple steps to achieve leveling at the desired distance.

7. The method of claim 6, wherein the leveling device is calibrated to read zero on the at least one display with a calibration plate before mounting on the rotary tablet compression machine.

8. The method of claim 7, wherein the adjustable supports are positioned to align with the at least three distanced sensors.

* * * * *